United States Patent
Shao et al.

(10) Patent No.: US 12,219,014 B2
(45) Date of Patent: Feb. 4, 2025

(54) METHODS AND SMART GAS INTERNET OF THINGS (IOT) SYSTEMS FOR SMART CONTROL OF SMART GAS PIPELINE NETWORK DATA COLLECTION TERMINALS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Bin Liu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/610,253

(22) Filed: Mar. 19, 2024

(65) Prior Publication Data
US 2024/0223661 A1    Jul. 4, 2024

(30) Foreign Application Priority Data
Jan. 31, 2024    (CN) .......................... 202410134476.8

(51) Int. Cl.
*H04L 67/12*   (2022.01)
*G16Y 10/35*   (2020.01)
(Continued)

(52) U.S. Cl.
CPC .............. *H04L 67/12* (2013.01); *G16Y 10/35* (2020.01); *G16Y 20/10* (2020.01); *G16Y 20/30* (2020.01); *G16Y 40/35* (2020.01)

(58) Field of Classification Search
CPC ........ G16Y 10/35; G16Y 20/10; G16Y 20/30; G16Y 40/35; H04L 67/12; Y02P 90/02
See application file for complete search history.

(56) References Cited

U.S. PATENT DOCUMENTS

| 2021/0174973 A1* | 6/2021 | Munoz | G16Y 30/00 |
| 2023/0324234 A1* | 10/2023 | Wang | G06N 3/08 |
| | | | 374/161 |

FOREIGN PATENT DOCUMENTS

| CN | 107420743 A | 12/2017 |
| CN | 108449765 A | 8/2018 |

(Continued)

OTHER PUBLICATIONS

S. Ahmed, F. Le Mouël and N. Stouls, "Resilient IoT-based Monitoring System for Crude Oil Pipelines," 2020 7th International Conference on Internet of Things: Systems, Management and Security (IOTSMS), Paris, France, 2020, pp. 1-7, doi: 10.1109/IOTSMS52051.2020.9340197 (Year: 2020).*

(Continued)

*Primary Examiner* — Jason D Recek
(74) *Attorney, Agent, or Firm* — METIS IP LLC

(57) ABSTRACT

Disclosed is a method for smart control of a gas pipeline network data collection terminal. The method may include: receiving, based on a preset transmission cycle, gas data and environmental monitoring data; in response to determining that at least one of the gas data or the environmental monitoring data does not meet a first preset condition, generating a first adjustment parameter; sending the first adjustment parameter to one or more first associated gas pipeline network data collection terminals; predicting, based on the gas data and the environmental monitoring data, future environmental change data at a future time point for an environment in which the gas pipeline network data collection terminal is located; in response to determining that the future environmental change data does not meet a second preset condition, generating a second adjustment parameter; and sending the second adjustment parameter to the gas pipeline network data collection terminal.

6 Claims, 7 Drawing Sheets

(51) Int. Cl.
   *G16Y 20/10*    (2020.01)
   *G16Y 20/30*    (2020.01)
   *G16Y 40/35*    (2020.01)

(56) References Cited

FOREIGN PATENT DOCUMENTS

| | | | |
|---|---|---|---|
| CN | 207992738 | U | 10/2018 |
| CN | 109215295 | A | 1/2019 |
| CN | 111970722 | A | 11/2020 |
| CN | 112345041 | A | 2/2021 |
| CN | 112929442 | A | 6/2021 |
| CN | 113886449 | A | 1/2022 |
| CN | 113900436 | A | 1/2022 |
| CN | 114339472 | A | 4/2022 |
| CN | 115001394 | A | 9/2022 |
| CN | 115496625 | A | 12/2022 |
| CN | 115619071 | A | 1/2023 |
| CN | 115619316 | A | 1/2023 |
| CN | 116011740 | A | 4/2023 |
| CN | 116127396 | A | 5/2023 |
| CN | 116205610 | A | 6/2023 |
| CN | 116558574 | A | 8/2023 |
| CN | 116562509 | A | 8/2023 |
| CN | 116642560 | A | 8/2023 |
| CN | 116757870 | A | 9/2023 |
| CN | 116863664 | A | 10/2023 |
| CN | 117111568 | A | 11/2023 |
| CN | 117132026 | A | 11/2023 |
| EP | 4043976 | A1 | 8/2022 |
| WO | 2017196821 | A1 | 11/2017 |
| WO | 2020215117 | A1 | 10/2020 |
| WO | 2023221846 | A1 | 11/2023 |

OTHER PUBLICATIONS

M. D. Y. Moussa, A. M. Aibinu, A. Abdurrahman, K. O. Shobowale and A. J. Chikezie, "Smart Pipeline Monitoring System: A Review," 2023 International Conference on Energy, Power, Environment, Control, and Computing (ICEPECC), Gujrat, Pakistan, 2023, pp. 1-6, doi: 10.1109/ICEPECC57281.2023.10209506. (Year: 2023).*
Notification to Grant Patent Right for Invention in Chinese Application No. 202410134476.8 mailed on Apr. 23, 2024, 7 pages.
First Office Action in Chinese Application No. 202410134476.8 mailed on Apr. 1, 2024, 25 pages.

* cited by examiner

600

```
┌─────────────────────────────────────────────────────────┐
│ Predicting future environmental change data at a future │
│ time point for an environment in which a gas pipeline   │    610
│ network data collection terminal is located based on    │
│ historical gas data of the gas pipeline network data    │
│ collection terminal, current gas data of the gas        │
│ pipeline network data collection terminal, historical   │
│ environmental monitoring data, and current              │
│ environmental monitoring data                           │
└─────────────────────────────────────────────────────────┘
                              │
                              ▼
┌─────────────────────────────────────────────────────────┐
│ In response to determining that the future              │
│ environmental change data does not meet a second        │    620
│ preset condition, determining a gas pipeline network    │
│ data collection terminal to be adjusted                 │
└─────────────────────────────────────────────────────────┘
                              │
                              ▼
┌─────────────────────────────────────────────────────────┐
│ Generating a second adjustment parameter based on the   │    630
│ future environmental change data                        │
└─────────────────────────────────────────────────────────┘
                              │
                              ▼
┌─────────────────────────────────────────────────────────┐
│ Sending the second adjustment parameter to the gas      │    640
│ pipeline network data collection terminal to be adjusted│
└─────────────────────────────────────────────────────────┘
```

FIG. 6

METHODS AND SMART GAS INTERNET OF THINGS (IOT) SYSTEMS FOR SMART CONTROL OF SMART GAS PIPELINE NETWORK DATA COLLECTION TERMINALS

CROSS-REFERENCE TO RELATED APPLICATIONS

This application claims priority to Chinese Patent Application No. 202410134476.8, filed on Jan. 31, 2024, the entire contents of which are hereby incorporated by reference.

TECHNICAL FIELD

The present disclosure relates to the field of the Internet of Things (IOT), and in particular, to a method and a smart gas Internet of Things (IOT) system for smart control of a smart gas pipeline network data collection terminal.

BACKGROUND

A gas pipeline network data collection terminal, as an important component of a gas system, is mainly responsible for collecting and monitoring key parameters of gas, such as pressure, flow, and temperature. The gas system triggers an alarm when the system detects an abnormal or out-of-range parameter. However, most traditional gas systems do not respond until a problem occurs, which lack an ability to predict, warn in advance, or automatically adjust the abnormal or out-of-range parameter. In addition, manual intervention is required when a problem or the alarm occurs, which may result in a delayed response, increasing safety risks and operational costs. The traditional gas systems may only perform basic recording and presentation of data, lacking an ability to analyze the data in depth. Additionally, existing data collection terminals for the gas network typically do not adapt to environmental factors, to some extent influencing a quality of gas and a stability of gas supply.

Therefore, it is desirable to provide a method and a smart gas Internet of Things (IoT) system for smart control of a gas pipeline network data collection terminal, which achieves coordinated management and automatic collection control of the gas pipeline network data collection terminal.

SUMMARY

One or more embodiments of the present disclosure provide a method for smart control of a gas pipeline network data collection terminal, wherein the method is executed by a smart gas device management platform of a smart gas Internet of Things (IOT) system. The method may include receiving, based on a preset transmission cycle, gas data collected by the gas pipeline network data collection terminal and environmental monitoring data collected by an environmental monitoring device, wherein the gas data may include gas pressure data, gas flow data, and gas temperature data, and the environmental monitoring data may include environmental temperature data, environmental visibility data, and environmental humidity data. The method may also include, in response to determining that at least one of the gas data or the environmental monitoring data does not meet a first preset condition, generating a first adjustment parameter, and sending the first adjustment parameter to one or more first associated gas pipeline network data collection terminals of the gas pipeline network data collection terminal. The method may also include predicting future environmental change data at a future time point for an environment in which the gas pipeline network data collection terminal is located based on the gas data and the environmental monitoring data, in response to determining that the future environmental change data does not meet a second preset condition, generating a second adjustment parameter, and sending the second adjustment parameter to the gas pipeline network data collection terminal.

One or more embodiments of the present disclosure provide a smart gas Internet of Things (IOT) system for smart control of a smart gas pipeline network data collection terminal. The IoT system may include a smart gas user platform, a smart gas service platform, a smart gas device management platform, a smart gas sensing network platform, and a smart gas object platform. The smart gas device management platform may include a smart gas indoor device parameter management sub-platform, a smart gas pipeline network device parameter management sub-platform, and a smart gas data center. The smart gas sensing network platform may include a smart gas indoor device sensing network sub-platform and a smart gas pipeline network device sensing network sub-platform. The smart gas object platform may include a smart gas indoor device object sub-platform and a smart gas pipeline network device object sub-platform. The smart gas data center may be configured to receive, based on a preset transmission cycle, gas data collected by the gas pipe network data collection terminal and environmental monitoring data collected by an environmental monitoring device through the smart gas pipeline network device sensing network sub-platform, and send the gas data and the environmental monitoring data to the smart gas pipeline network device parameter management sub-platform, wherein the gas data may include gas pressure data, gas flow data, and gas temperature data, and the environmental monitoring data may include environmental temperature data, environmental visibility data, and environmental humidity data. The preset transmission cycle may be determined by the smart gas pipeline network device parameter management sub-platform and sent to the smart gas pipeline network device object sub-platform via the smart gas pipeline network device sensing network sub-platform. The smart gas pipeline network device parameter management sub-platform may be configured to, in response to determining that at least one of the gas data or the environmental monitoring data does not meet a first preset condition, generate a first adjustment parameter. The smart gas pipeline network device parameter management sub-platform may be configured to send the first adjustment parameter to the smart gas pipeline network device object sub-platform via the smart gas pipeline network device sensing network sub-platform, and the smart gas pipeline network device object sub-platform may be configured to send the first adjustment parameter to a first associated gas pipeline network data collection terminal of the gas pipeline network data collection terminal. The smart gas pipeline network device parameter management sub-platform may be configured to predict, based on the gas data and the environmental monitoring data, future environmental change data at a future time point for an environment in which the gas pipeline network data collection terminal is located, and the smart gas data center may be configured to store the future environmental change data. The smart gas pipeline network device parameter management sub-platform may be configured to, in response to determining that the future environmental change data does not meet a second preset condition, generate a second adjustment parameter.

The smart gas pipeline network device parameter management sub-platform may be configured to send the second adjustment parameter to the gas pipeline network data collection terminal.

BRIEF DESCRIPTION OF THE DRAWINGS

The present disclosure will be further illustrated by way of exemplary embodiments, which are described in detail with the accompanying drawings. These embodiments are non-limiting. In these embodiments, the same count indicates the same structure, wherein:

FIG. 6 is a flowchart illustrating an exemplary process for smart control of a gas pipeline network data collection terminal according to some embodiments of the present disclosure.

DETAILED DESCRIPTION

Figure 1:
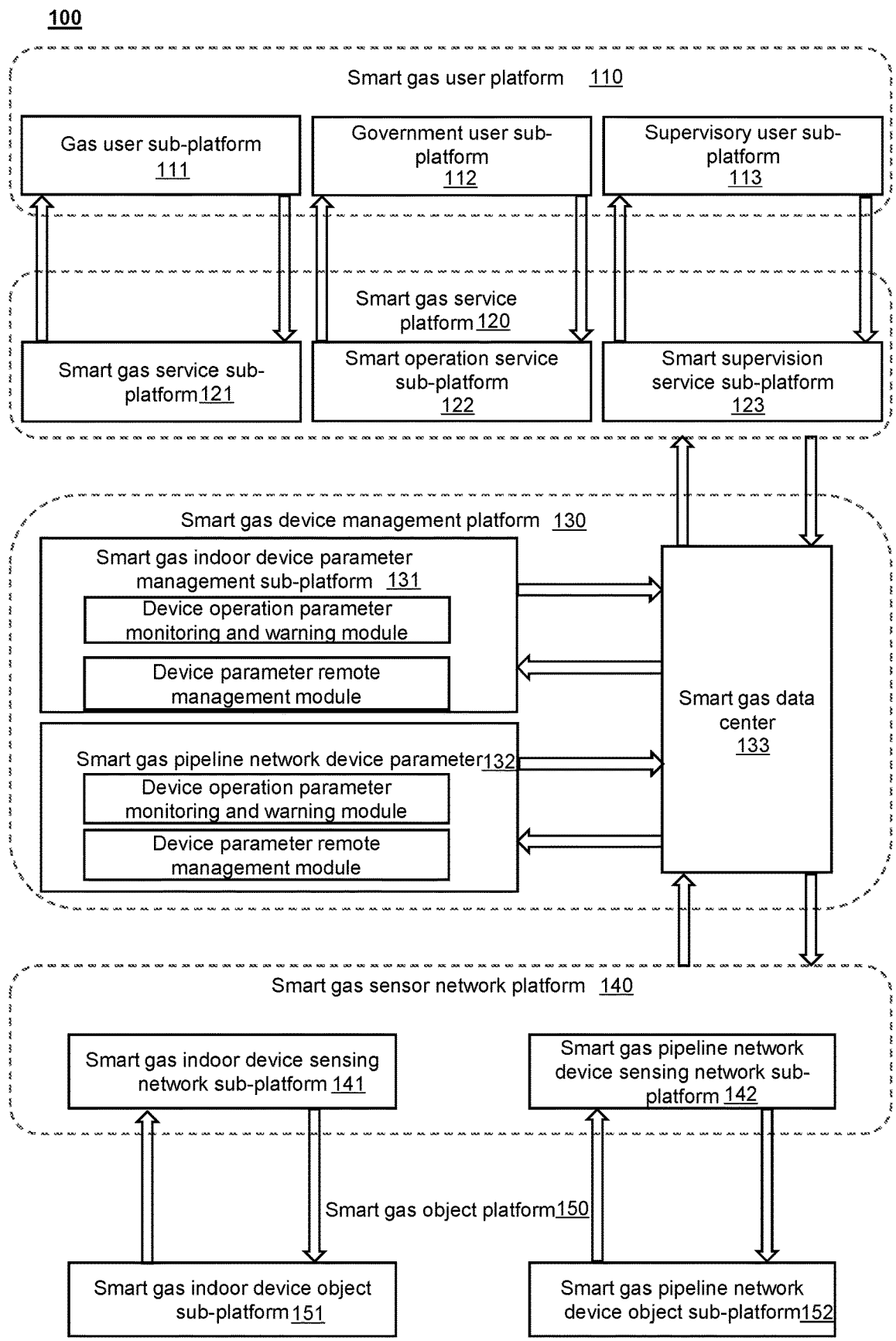
FIG. 1 is a schematic structural diagram illustrating a smart gas Internet of Things (IoT) system according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

FIG. 1 is a schematic structural diagram illustrating a smart gas Internet of Things (IOT) system according to some embodiments of the present disclosure. As shown in FIG. 1, a smart gas Internet of Things (IOT) system 100 may include a smart gas user platform 110, a smart gas service platform 120, a smart gas device management platform 130, a smart gas sensing network platform 140, and a smart gas object platform 150.

The smart gas user platform 110 refers to a platform for interacting with a user. In some embodiments, the smart gas user platform 110 may be configured as a terminal device.

In some embodiments, the smart gas user platform 110 may include a gas user sub-platform 111, a government user sub-platform 112, and a supervisory user sub-platform 113.

The smart gas service platform 120 refers to a platform for communicating information about need(s) and control information of the user. In some embodiments, the smart gas service platform 120 may obtain automatic collection and control information from the smart gas device management platform 130 (e.g., a smart gas data center 133) and send the obtained information to the supervisory user sub-platform 113.

In some embodiments, the smart gas service platform 120 may include a smart gas consumption service sub-platform 121, a smart operation service sub-platform 122, and a smart supervision service sub-platform 123.

The smart gas device management platform 130 refers to a functional platform that coordinates and harmonizes the connection and collaboration between various functional platforms. The smart gas device management platform 130 aggregates all information of the IoT system and provides perception management and control management functions for an operation of the IoT system.

In some embodiments, the smart gas device management platform 130 may include a smart gas indoor device parameter management sub-platform 131, a smart gas pipeline network device parameter management sub-platform 132, and the smart gas data center 133.

The smart gas sensing network platform 140 refers to a functional platform for managing sensing communications. In some embodiments, the smart gas sensing network platform 140 may perform functions of sensing communications for sensing information and sensing communications for controlling information.

In some embodiments, the smart gas sensing network platform 140 may include a smart gas indoor device sensing network sub-platform 141 and a smart gas pipeline network device sensing network sub-platform 142.

The smart gas object platform 150 is a functional platform for sensing information generation and controlling information execution. For example, the smart gas object platform 150 may monitor and generate operation information for a gas indoor device and a gas pipeline network device.

In some embodiments, the smart gas object platform 150 may include a smart gas indoor device object sub-platform 151 and a smart gas pipeline network device object sub-platform 152.

In some embodiments, the smart gas data center 133 may be configured to receive, based on a preset transmission cycle, gas data collected by a gas pipeline network data collection terminal and environmental monitoring data collected by an environmental monitoring device via the smart gas pipeline network device sensing network sub-platform 142, and send the gas data and the environmental monitoring data to the smart gas pipeline network device parameter management sub-platform 132. The gas data may include gas pressure data, gas flow data, and gas temperature data. The environmental monitoring data may include environmental temperature data, environmental visibility data, and environmental humidity data. The preset transmission cycle may be determined by the smart gas pipeline network device parameter management sub-platform and transmitted to the smart gas pipeline network device object sub-platform 152 via the smart gas pipeline network device sensing sub-platform 142.

In some embodiments, the smart gas pipeline network device parameter management sub-platform 132 may be configured to, in response to determining that at least one of the gas data or the environmental monitoring data does not meet a first preset condition, generate a first adjustment parameter. In some embodiments, the smart gas pipeline network device parameter management sub-platform 132 may be configured to send the first adjustment parameter to the smart gas pipeline network device object sub-platform 152 via the smart gas pipeline network device sensing network sub-platform 142, and then the smart gas pipeline network device object sub-platform may be configured to send the first adjustment parameter to one or more first associated gas pipeline network data collection terminals of the gas pipeline network data collection terminal. In some embodiments, the smart gas pipeline network device parameter management sub-platform 132 may be configured to predict, based on the gas data and the environmental monitoring data, future environmental change data at a future time point for an environment in which the gas pipeline network data collection terminal is located, and the smart gas data center 133 may be configured to store the future environmental change data. In some embodiments, the smart gas pipeline network device parameter management sub-platform 132 may be configured to, in response to determining that the future environmental change data does not meet a second preset condition, generate a second adjustment parameter, and the smart gas pipeline network device parameter management sub-platform 132 may be configured to send the second adjustment parameter to the gas pipeline network data collection terminal.

In some embodiments of the present disclosure, the smart gas IoT system may form a closed loop of information operation between the smart gas device management platform, the smart gas sensing network platform, and the smart gas object platform, and operate in a regulated and coordinated manner under the unified management of the smart gas device management platform, realizing coordinated management of gas pipeline network data collection terminals, information automation for data collection, and remote control, all in a smart and digitized way.

In some embodiments, the smart gas device management platform 130 may determine the first adjustment parameter and further determine a first comprehensive adjustment parameter based on location data of the gas pipeline network data collection terminal, the gas data, and the environmental monitoring data. More descriptions regarding the determination of the first adjustment parameter and the first comprehensive adjustment parameter may be found in the following relevant descriptions.

In some embodiments, the smart gas device management platform 130 may generate the second adjustment parameter based on historical gas data of the gas pipeline network data collection terminal, current gas data of the gas pipeline network data collection terminal, historical environmental monitoring data, and current environmental monitoring data. More descriptions regarding the second adjustment parameter may be found in the following relevant descriptions.

Figure 2:
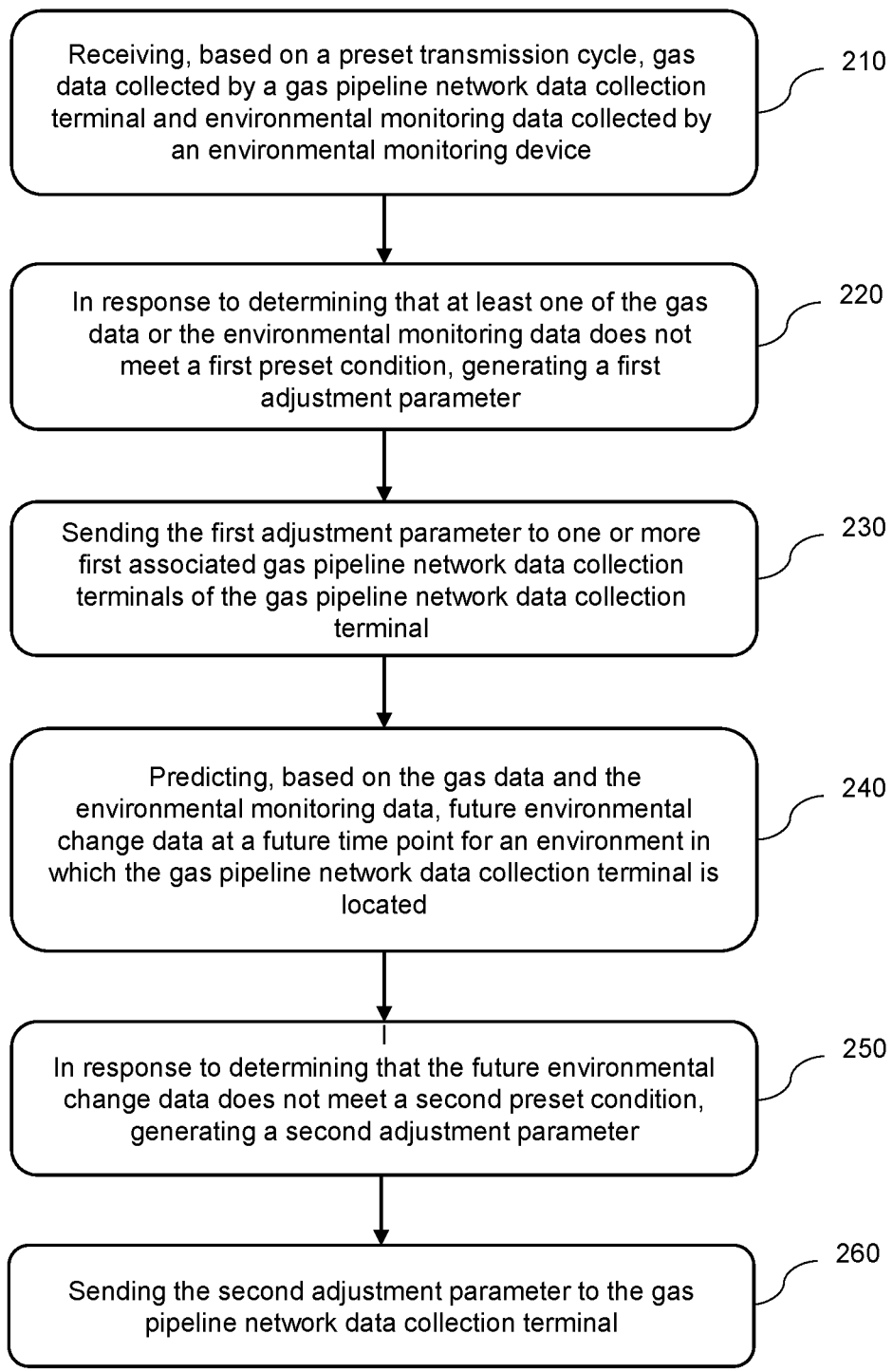
FIG. 2 is a flowchart illustrating an exemplary process for smart control of a gas pipeline network data collection terminal according to some embodiments of the present disclosure.

FIG. 2 is a flowchart illustrating an exemplary process for smart control of a gas pipeline network data collection terminal according to some embodiments of the present disclosure. As shown in FIG. 2, process 200 may include the following operations 210-260. In some embodiments, process 200 may be performed by the smart gas device management platform 130 of the smart gas IoT system 100.

In 210, gas data collected by the gas pipeline network data collection terminal and environmental monitoring data collected by an environmental monitoring device may be received based on a preset transmission cycle.

A preset transmission cycle refers to a preset cycle for transmitting data from the gas pipeline network data collection terminal to the smart gas device management platform 130, and the preset transmission cycle may be preset by a technician based on experience.

A gas pipeline network data collection terminal refers to a terminal used for collecting the gas data. Gas data refers to data related to characteristic(s) of gas in gas transmission. In some embodiments, the gas data may include gas pressure data, gas flow data, gas temperature data, etc. In some embodiments, the gas data may be obtained by the gas pipeline network data collection terminal.

Environmental monitoring data refers to data that is associated with an environment in which the gas pipeline network data collection terminal is located. In some embodiments, the environmental monitoring data may include environmental temperature data, environmental visibility data, environmental humidity data, etc.

In some embodiments, the environmental monitoring data may be obtained by an environmental monitoring device. The environmental monitoring device is used to obtain the environmental data. For example, the environmental monitoring device may include a thermometer for obtaining the environmental temperature data and a hygrometer for obtaining the environmental humidity data. In some embodiments, the environmental monitoring device may include an image acquisition device (e.g., a camera). The environmental monitoring device may capture an image using the image acquisition device and process the image using an image recognition technique to extract an image feature, thereby obtaining the environmental visibility data.

In 220, in response to determining that at least one of the gas data or the environmental monitoring data does not meet a first preset condition, a first adjustment parameter may be generated.

In some embodiments, the first adjustment parameter may be generated if it is determined that at least one of the gas data or the environmental monitoring data does not meet the first preset condition. Failure to meet the first preset condition may include the gas data not meeting a preset gas threshold range, and the environmental monitoring data not meeting a preset environmental threshold range. For example, if it is determined that the gas pressure data in the gas data is greater than a preset pressure threshold, the first adjustment parameter may be generated. As another example, if the gas pressure data in the gas data is greater than the preset pressure threshold, and the environmental temperature data in the environmental monitoring data is greater than a preset temperature threshold, the first adjustment parameter is generated. More descriptions regarding the determination of the first adjustment parameter based on at least one of the gas data or the environmental monitoring data may be found in FIGS. 3-5 and the related descriptions thereof.

A first adjustment parameter is a parameter for adjusting an operation of one or more first associated gas pipeline network data collection terminals of the gas pipeline network data collection terminal. The first adjustment parameter includes a parameter for adjusting a collection cycle of the one or more first associated gas pipeline network data collection terminals. The adjustment of the collection cycle includes increasing the collection cycle and reducing the collection cycle. A collection cycle is a cycle for data collection by the gas pipeline network data collection terminal. For example, if the first adjustment parameter is a positive value, the collection cycle is reduced and the collection frequency is increased; if the first adjustment parameter is 0, the collection cycle remains unchanged; if the first adjustment parameter is a negative value, the collection cycle is increased and the collection frequency is decreased. The greater an absolute value of the first adjustment parameter, the larger a magnitude of increasing or decreasing the collection cycle.

In some embodiments, the first adjustment parameter may be used to adjust a second associated gas pipeline network data collection terminal associated with an abnormal gas pipeline network data collection terminal. In other words, the first adjustment parameter may reduce the collection cycle of the second associated gas pipeline network data collection terminal and increase the collection frequency. More descriptions may be found in the relevant descriptions below.

In 230, the first adjustment parameter may be sent to the one or more first associated gas pipeline network data collection terminals of the gas pipeline network data collection terminal.

A first associated gas pipeline network data collection terminal refers to a gas pipeline network data collection terminal associated with a gas pipeline network data collection terminal. For example, the smart gas device management platform 130 may take a gas pipeline network data collection terminal as a center and use a circle with a preset distance as a radius to define a preset range. Within the preset range, other gas pipeline network data collection terminal(s) may be designated as the one or more first associated gas pipeline network data collection terminals of the gas pipeline network data collection terminal. In some embodiments, the one or more first associated gas pipeline network data collection terminals may include a plurality of first associated gas pipeline network data collection terminals. In some embodiments, a second associated gas pipeline network data collection terminal may be associated with a gas pipeline network data collection terminal that is inherently abnormal or malfunctioning, or associated with a gas pipeline network data collection terminal that collects abnormal data. The one or more first associated gas pipeline network data collection terminals may include the second associated gas pipeline network data collection terminal.

In some embodiments, the second associated gas pipeline network data collection terminal may further include a gas pipeline network data collection terminal whose association degree with the abnormal gas pipeline network data collection terminal is greater than an association degree threshold. The association degree threshold may be artificially preset based on experience. More descriptions regarding the association degree may be found in the relevant descriptions below.

In some embodiments, the smart gas device management platform 130 may send the first adjustment parameter to the smart gas pipeline network device object sub-platform 152 via the smart gas pipeline network device sensing network sub-platform 142, thereby sending the first adjustment parameter to the one or more associated gas pipeline network data collection terminal. After receiving the first adjustment parameter, the one or more associated gas pipeline network data collection terminals adjust operations based on the first adjustment parameter.

In 240, future environmental change data at a future time point for an environment in which the gas pipeline network data collection terminal is located may be predicted based on the gas data and the environmental monitoring data.

Future environmental change data refers to data related to a change in the environment in which the gas pipeline network data collection terminal is located at a future time point relative to a current time point. The future environmental change data may be represented by a magnitude of the change in the environment in which the gas pipeline network data collection terminal is located at the future time point relative to the current time point. The future environmental change data may reflect a change in temperature (e.g., caused by gas regulation or environmental temperature changes), a change in visibility (e.g., caused by limited image acquisition), or the like.

In some embodiments, the future environmental change data may be predicted based on the gas data and the environmental monitoring data in a variety of feasible ways, such as through a modeling algorithm. More descriptions regarding the prediction of the future environmental change data may be found in FIG. 7 and the related descriptions thereof.

In 250, in response to determining that the future environmental change data does not meet a second preset condition, a second adjustment parameter may be generated.

In some embodiments, the future environmental change data not meeting the second preset condition means that the future environmental change data exceeds a preset change data threshold. For example, the environmental temperature in the future environmental change data exceeds a preset future temperature threshold. More descriptions regarding the second preset condition may be found in the relevant descriptions below.

The second adjustment parameter is similar to the first adjustment parameter and more descriptions regarding the second adjustment parameter may be found in the previous description of the first adjustment parameter. In some embodiments, the second adjustment parameter may be used to adjust the gas pipeline network data collection terminal that is inherently abnormal or malfunctioning, or the gas pipeline network data collection terminal that collects abnormal data. More descriptions may be found in FIG. 6 and the related descriptions thereof.

In 260, the second adjustment parameter may be sent to the gas pipeline network data collection terminal.

In some embodiments, the gas pipeline network data collection terminal may be the gas pipeline network data collection terminal that is abnormal or malfunctioning, or the gas pipeline network data collection terminal that collects abnormal data. The smart gas device management platform 130 may send the second adjustment parameter to the smart gas pipeline network device object sub-platform 152 through the smart gas pipeline network device sensing network sub-platform 142, so as to send the second adjustment parameter to the gas pipeline network data collection terminal. After receiving the second adjustment parameter, the gas pipeline network data collection terminal adjusts its operation based on the second adjustment parameter.

In some embodiments of the present disclosure, by generating the first adjustment parameter based on at least one of the gas data or the environmental monitoring data, the gas pipeline network data collection terminal may adjust the collection cycle to collect the gas data in a timelier manner and detect abnormalities. By predicting the future environmental change data based on the gas data and the environmental monitoring data and generating the second adjustment parameter, the gas pipeline network data collection terminal may further adjust the collection cycle based on a predicted result, so that the adjustment parameters of the collection cycle can be more in line with relevant condition(s) of the environment in which the gas pipeline network data collection terminal is located, further reducing risks.

Figure 3:
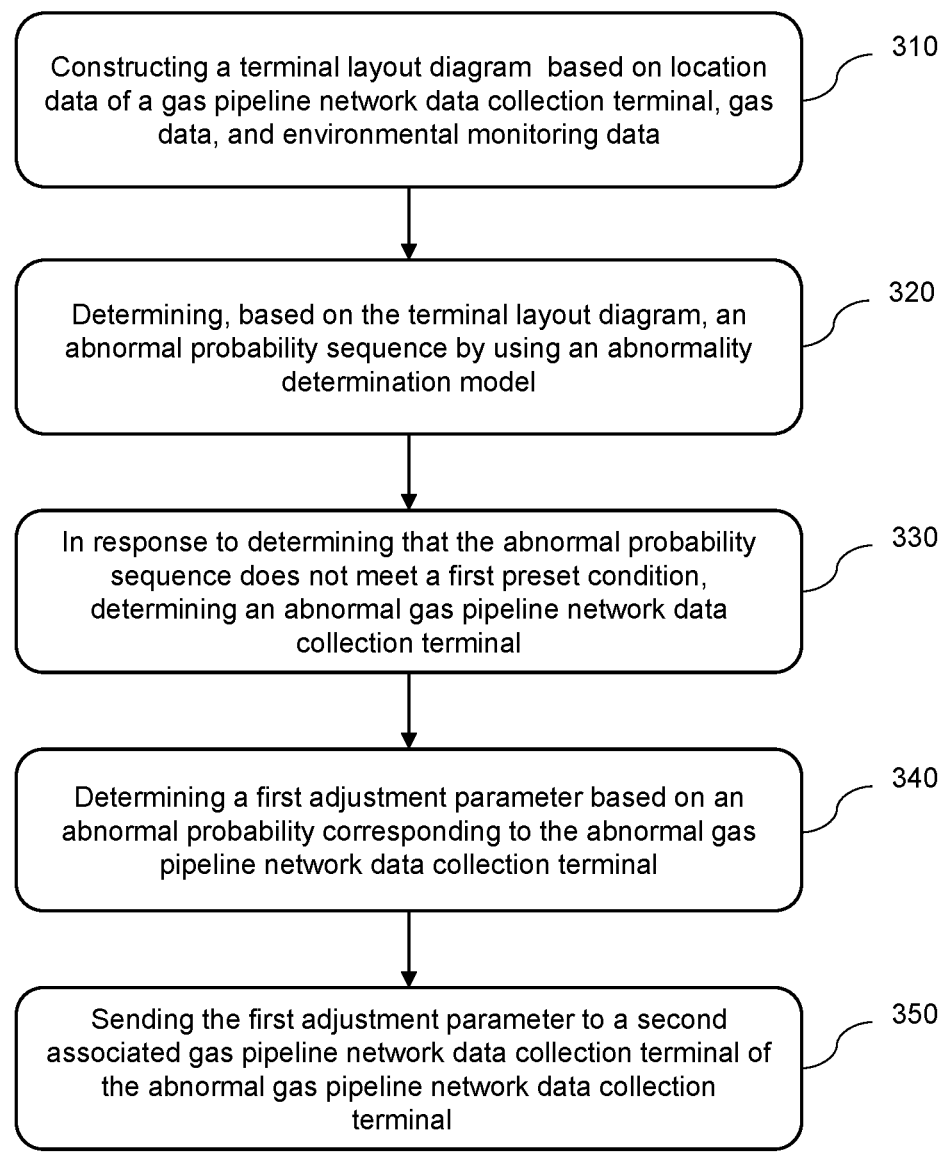
FIG. 3 is a flowchart illustrating an exemplary process for smart control of a gas pipeline network data collection terminal according to some embodiments of the present disclosure.

FIG. 3 is a flowchart illustrating an exemplary process for smart control of a gas pipeline network data collection terminal according to some embodiments of the present disclosure. As shown in FIG. 3, process 300 includes the following operations. In some embodiments, process 300 may be performed by the smart gas device management platform 130 of the smart gas IoT system 100.

In 310, a terminal layout diagram may be constructed based on location data of the gas pipeline network data collection terminal, gas data, and environmental monitoring data.

Location data refers to data reflecting a location of the gas pipeline network data collection terminal. In some embodiments, the location data may be a coordinate of the gas pipeline network data collection terminal. The location data may be obtained from the smart gas data center 133. In some embodiments, after an installation of the gas pipeline network data collection terminal is completed, the location data of the gas pipeline network data collection terminal is recorded and stored in the smart gas data center 133. More descriptions regarding the gas data and the environmental monitoring data may be found in the relevant descriptions above.

A terminal layout diagram is a diagram reflecting a layout of gas pipeline network data collection terminals in a gas pipeline network. The terminal layout diagram may include an edge and a node. In some embodiments, the node of the terminal layout diagram may correspond to the gas pipeline network data collection terminal, and the edge of the terminal layout diagram may correspond to a gas pipeline between the gas pipeline network data collection terminals. The edge may be a directed edge, and a direction of the edge is determined by a direction of gas flow.

In some embodiments, an edge feature of the edge of the terminal layout diagram may include a pipeline distance of the gas pipeline between the gas pipeline network data collection terminals. In some embodiments, the edge feature of the edge of the terminal layout diagram may include gas flow velocity data of the gas pipeline to reflect a gas transmission rate.

In some embodiments, a node feature of the node in the terminal layout diagram may include the location of the gas pipeline network data collection terminal, historical and current gas data, and historical and current environmental monitoring data. The location of the gas pipeline network data collection terminal may be obtained from the aforementioned location data of the gas pipeline network data collection terminal, and more descriptions regarding the gas data and the environmental monitoring data may be found in the relevant descriptions above.

In some embodiments, the node feature of the node in the terminal layout diagram may also include association degree data. The association degree data represents an association degree between a node and other nodes. For example, association degree data of node 1 is represented as (association degree (12), association degree (13), . . . ) and association degree data of node 2 is represented as (association degree (21), association degree (23), . . . ). The association degree (12) indicates an association degree between node 1 and node 2, and the association degree (12) is not equal to the association degree (21). More descriptions regarding the determination of the association degree may be found in FIG. 5 and the relevant descriptions thereof.

In some embodiments, by incorporating the association degree data into the node feature of the terminal layout diagram, the model may, when determining whether the gas pipeline network data collection terminal at a node is abnormal or not, pay more attention to the gas pipeline network data collection terminal that has a high association degree, thereby improving determination accuracy and computational speed simultaneously.

In 320, an abnormal probability sequence may be determined based on the terminal layout diagram.

An abnormal probability sequence is a sequence composed of abnormal probabilities, which includes an abnormal probability of the node corresponding to the gas pipeline network data collection terminal. An abnormal probability of the node corresponding to the gas pipeline network data collection terminal refers to a probability of the gas pipeline network data collection terminal being abnormal or a probability of the gas pipeline network data collection terminal collecting abnormal data. In some embodiments, the abnormal probability sequence may be expressed as follows: [(node 1, abnormal probability 1), (node 2, abnormal probability 2), . . . ].

In some embodiments, the abnormal probability sequence may be determined in a variety of feasible ways based on the terminal layout diagram. For example, the abnormal probability sequence may be determined based on the terminal layout diagram using manual historical experience. As another example, a corresponding relationship may be fitted through historical data, so that the abnormal probability sequence may be determined through the terminal layout diagram.

In some embodiments, the smart gas device management platform 130 may determine the abnormal probability sequence based on the terminal layout diagram through an abnormality determination model.

In some embodiments, the abnormality determination model may be a machine learning model. For example, the abnormality determination model may be a graph neural network (GNN) model, or a GNN model with additional processing layer(s) and altered processing technique(s).

Figure 4:
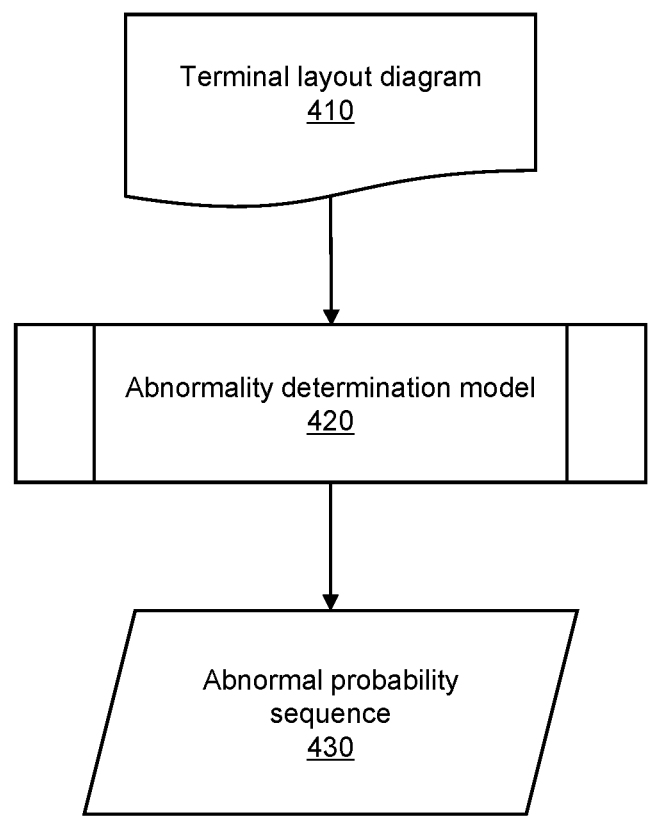
FIG. 4 is a schematic diagram illustrating an abnormality determination model according to some embodiments of the present disclosure.

FIG. 4 is a schematic diagram illustrating an abnormality determination model according to some embodiments of the present disclosure.

As shown in FIG. 4, an input of an abnormality determination model 420 may be a terminal layout diagram 410, and an output of the abnormality determination model 420 may be an abnormal probability sequence 430 that includes anomaly probabilities output based on each node.

In some embodiments, the abnormality determination model 420 may be obtained by training a large count of first training samples with first labels. A first training sample may include a sample terminal layout diagram, and the first training sample may be obtained based on historical data. A first label may indicate whether a gas pipeline network data collection terminal corresponding to a node of the terminal layout diagram is abnormal.

The first label may be obtained by artificially adjusting collection data of a plurality of gas pipeline network data collection terminals at some positions, or may be obtained by rendering the plurality of gas pipeline network data collection terminals incapable of collecting normal data. The first label may also be obtained by using a plurality of gas pipeline network data collection terminals that are abnormal or malfunctioning for data collection. In some embodiments, the smart gas device management platform 130 may construct the sample terminal layout diagram based on abnormal data collected by the aforementioned gas pipeline network data collection terminals and normal data collected by normal gas pipeline network data collection terminals. The label represents an abnormality of the aforementioned gas pipeline network data collection terminal. The smart gas device management platform 130 may set an abnormality of an adjusted gas pipeline network data collection terminal or an inherently abnormal gas pipeline network data collection terminal as abnormal, and set an abnormality of a normal gas pipeline network data collection terminal as normal. For example, the abnormality of the gas pipeline network data collection terminal may be represented as [(node 1, abnormal), (node 2, normal)].

In 330, an abnormal gas pipeline network data collection terminal, in response to determining that the abnormal probability sequence does not meet a first preset condition, may be determined An abnormal gas pipeline network data collection terminal refers to a gas pipeline network data collection terminal that may be abnormal. In some embodiments, the abnormal gas pipeline network data collection terminal include a gas pipeline network data collection terminal that is inherently abnormal or malfunctioning, as well as a gas pipeline network data collection terminal that collects abnormal data. Abnormal data refers to gas data that exceeds a preset threshold, which indicates a possible malfunction in the gas pipeline.

In some embodiments, the smart gas device management platform 130 determines the gas pipeline network data collection terminal corresponding to a node in the abnormal probability sequence as the abnormal gas pipeline network data collection terminal, based on a condition that the abnormal probability of the corresponding node in the abnormal probability sequence exceeds a preset threshold.

In 340, the first adjustment parameter may be determined based on the abnormal probability corresponding to the abnormal gas pipeline network data collection terminal.

In some embodiments, the smart gas device management platform 130 may determine the first adjustment parameter based on the abnormality probability corresponding to the abnormal gas pipeline network data collection terminal in various ways. For example, a preset table may be constructed based on the abnormal probability of the gas pipeline network data collection terminal, and the first adjustment parameter may be determined by referring to the preset table. The preset table may be constructed based on historical actual data or constructed by a technician based on prior knowledge or historical experience. In some embodiments, the higher the abnormal probability is, the larger the first adjustment parameter is, and the more the collection cycle needs to be scaled down.

In some embodiments, when in a peak gas consumption period, the smart gas device management platform 130 may increase the first adjustment parameter in order to appropriately reduce the collection cycle of the gas pipeline network data collection terminal, increase the collection frequency, and improve the accuracy of data collection.

In some embodiments, the smart gas device management platform 130 may also determine an importance level of the abnormal gas pipeline network data collection terminal, wherein the first adjustment parameter may be correlated to the importance level of the abnormal gas pipeline network data collection terminal.

An importance level of the gas pipeline network data collection terminal is used to reflect the importance level of the pipeline where the gas pipeline network data collection terminal is located or the pipeline that is monitored. That is, the importance level of the gas pipeline network data collection terminal may be equated with the importance level of the pipeline.

In some embodiments, the smart gas device management platform 130 may determine the importance level of the pipeline by constructing an image of the pipeline. For example, the smart gas device management platform 130 may construct a pipeline image based on a pipeline route, and the pipeline image may include a pipeline node, a user node, and a directed path.

The pipeline node may correspond to the pipeline in a gas pipeline network, such as pipeline node A and pipeline node B. The user node may correspond to a gas user, such as user node 1 and user node 2. The directed path may be a pipeline-to-pipeline directed path, a pipeline-to-user directed path, wherein the direction is a direction of gas flow, and the directed path exists only between nodes that are actually connected. For example, a directed path A1 may represent a path from the pipeline node A to the user node 1.

In some embodiments, the importance level of the pipeline may be indicated by all paths that may be reached from the pipeline node to all user nodes, along the direction of the gas flow rather than against the direction of the gas flow.

In some embodiments, the importance level of the pipeline may be equivalent to an importance level of the pipeline node, and the importance level of the pipeline node may be correlated to an importance level of an end node of the path. The higher the importance level of the end node of the path is, the higher the importance level of the pipeline node is. For example, the importance level of the pipeline may be obtained by equation (1):

$$P = r_1 * u_1 + r_2 * u_2 + \dots \dots + r_i * u_i. \tag{1}$$

Wherein P represents the importance level of the pipeline, $r_i$ represents a path coefficient corresponding to path i and $u_i$ represents the importance level of the end node corresponding to path i.

The end node may include the user node, which is a node with only gas inflow and without gas outflow. In this case, the importance level of the end node may be equivalent to the importance level of the corresponding user.

In some embodiments, the importance level of the user may be related to factors such as an amount of gas usage, a duration of gas usage, and an on-time payment probability. In some embodiments, the longer the user uses gas is, the larger the amount of gas usage is, and the higher the on-time payment probability is, the higher the importance level of the user is. For example, the importance level of the user may be calculated using equation (2):

$$u = k1 * \text{amount of gas usage} + \tag{2}$$
$$k2 * \text{duration of gas usage} + k3 * \text{on-time payment probability}$$

Wherein u represents the importance level of the user. k1, k2, and k3 represent weighting coefficients, which may be manually set. The duration of gas usage refers to a time when the user starts using gas. The amount of gas usage, the duration of gas usage, and the on-time payment probability may be obtained or determined from the smart gas data center 133.

The path coefficient may be positively correlated with a path length or a proximity between a start node and an end node of each path. A path length refers to a total count of nodes that a path passes from the pipeline node to the user node, and the path length includes the start node and the end node. In some embodiments, the path length may also be expressed in terms of the proximity. That is, the path length refers to the proximity between the start node and the end node of the path. For example, if the path includes node A→node B→node C, then node A and node C have a proximity of 2.

In some embodiments, if a node is located upstream of the pipeline, the greater a count of downstream branches, the more important the node is. For example, in a section of the pipeline, pipeline node A is an upstream node of pipeline node B, pipeline node B is an upstream node of pipeline node C, pipeline node A is also connected to end node 1 (i.e., user node 1), pipeline node B is also connected to end node 2 (i.e., user node 2), and pipeline node C is also connected to end node 3 (i.e., user node 3) and end node 4 (i.e., user node 4). When pipeline node C fails, two nodes (i.e., user node 3 and user node 4) are affected; when pipeline node B fails, user node 2, user node 3, user node 4, and pipeline node C are affected; when pipeline node A fails, pipeline node B, pipeline node C, user node 1, user node 2, user node 3, and user node 4 are affected. Therefore, pipeline node A may be determined as the most important node in the section of the pipeline.

In some embodiments, the smart gas device management platform 130 may determine the first adjustment parameter to be sent to a second associated gas pipeline network data collection terminal based on the importance level of the abnormal gas pipeline network data collection terminal. For example, if the importance level of the abnormal gas pipeline network data collection terminal is greater than a preset threshold value, the first adjustment parameter is appropriately increased, and the greater the importance level of the abnormal gas pipeline network data collection terminal, the larger an adjustment amplitude.

In some embodiments of the present disclosure, the smart gas device management platform may make appropriate adjustments to the first adjustment parameter by considering the importance level of the abnormal gas pipeline network data collection terminal, thus making the first adjustment parameter more in line with actual situation(s). When a relatively important gas pipeline network data collection terminal is abnormal or malfunctions, normal data collection may not be performed or the data collected by the gas pipeline network data collection terminal is invalid. At this time, it is necessary to increase the collection frequency of the second associated gas pipeline network data collection terminal as a certain degree of compensation. When a plurality of gas pipeline network data collection terminals collect a sudden change or abnormality in the gas flow, it may be assumed that a pipeline failure may occur. Since the importance level of the gas pipeline network data collection terminal is equal to the importance level of the pipeline, it may be understood that the greater the importance level of the pipeline is, the more serious a consequence may be caused when the failure occurs. For example, the consequence may include abnormalities in other pipelines. In this case, a frequency of data collection of other associated gas pipeline network data collection terminals may be increase to ensure the safety of the pipelines.

In 350, the first adjustment parameter may be sent to the second associated gas pipeline network data collection terminal of the abnormal gas pipeline network data collection terminal.

More descriptions regarding the sending of the first adjustment parameter may be found in FIG. 2 and the related descriptions thereof.

In the method shown in some embodiments of the present disclosure, the smart gas device management platform can improve the accuracy of the first adjustment parameter by constructing the terminal layout diagram, determining the abnormal probability sequence using the abnormality determination model, and finally determining the abnormal gas pipeline network data collection terminal based on the first preset condition and the first adjustment parameter, making the abnormal probability sequence more consistent with actual conditions.

Figure 5:
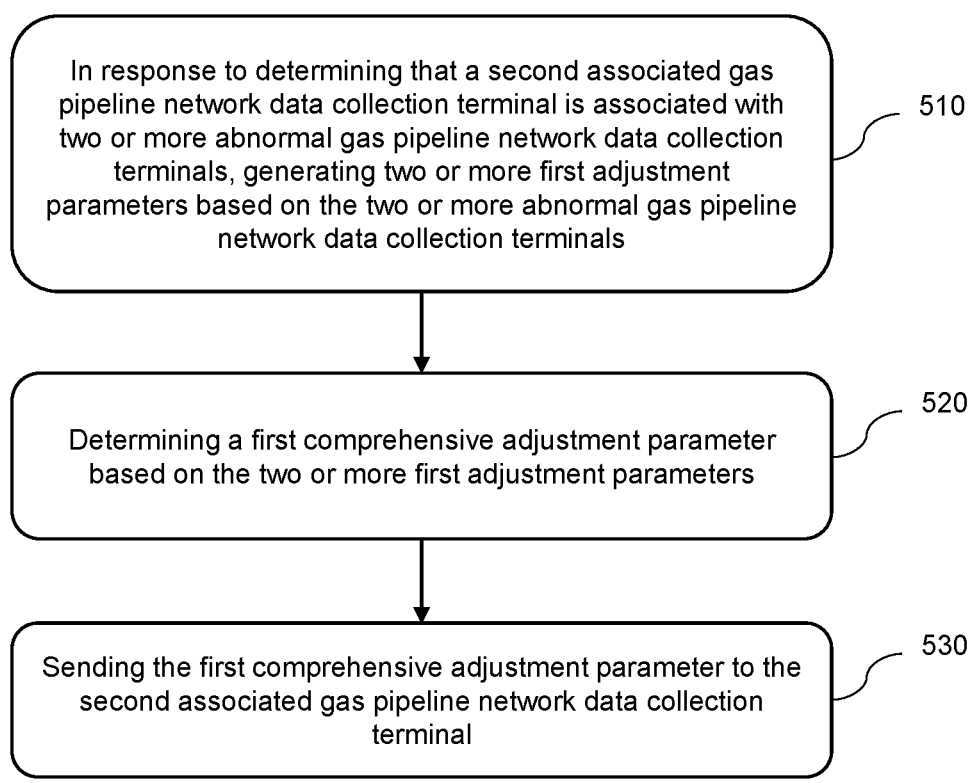
FIG. 5 is a flowchart illustrating an exemplary process for smart control of a gas pipeline network data collection terminal according to some embodiments of the present disclosure.

FIG. 5 is a flowchart illustrating an exemplary process for smart control of a gas pipeline network data collection terminal according to some embodiments of the present disclosure. As shown in FIG. 5, process 500 includes the following operations. In some embodiments, process 500 may be performed by the smart gas device management platform 130 of the smart gas Internet of Things (IOT) system 100.

In 510, in response to determining that a second associated gas pipeline network data collection terminal is associated with two or more abnormal gas pipeline network data collection terminals, two or more first adjustment parameters may be generated based on the two or more abnormal gas pipeline network data collection terminals.

In some embodiments, when the second associated gas pipeline network data collection terminal is associated with the two or more abnormal gas pipeline network data collection terminals, the smart gas device management platform 130 may generate the two or more first adjustment parameters based on the two or more abnormal gas pipeline network data collection terminal. More descriptions regarding the generation of the first adjustment parameter may be found in FIG. 3 and the related descriptions thereof.

In 520, a first comprehensive adjustment parameter may be determined based on the two or more first adjustment parameters.

The first comprehensive adjustment parameter is an adjustment parameter obtained by comprehensively processing the two or more first adjustment parameters. In some embodiments, an association degree between the abnormal gas pipeline network data collection terminal and the corresponding second associated gas pipeline network data collection terminal may correspond to a first coefficient, and the first comprehensive adjustment parameter may be determined based on the first coefficient and the first adjustment parameter. For example, the first comprehensive adjustment parameter may be calculated by equation (3):

$$C = f_1 * y_1 + f_2 * y_2 + \ldots + f_n * y_n \qquad (3)$$

Wherein, C represents the first comprehensive adjustment parameter, y1, y2, . . . , and yn represent first adjustment parameters determined based on a first to an n-th abnormal gas pipeline network data collection terminals associated with the second associated gas pipeline network data collection terminal, f1, f2, . . . , and fn represent first coefficients corresponding to association degrees between the first to the n-th abnormal gas pipeline network data collection terminals and the corresponding second associated gas pipeline network data collection terminal, respectively.

In some embodiments, the first coefficient may be positively correlated with the association degree between the abnormal gas pipeline network data collection terminal and the corresponding second associated gas pipeline network data collection terminal, and the greater the association degree is, the greater the first coefficient is. More descriptions regarding the association degree may be found in FIG. 3 and the related descriptions thereof.

In some embodiments, the association degree may be related to a distance between two nodes corresponding to the gas pipeline network data collection terminal in a terminal layout diagram. For example, node 1 corresponds to the abnormal gas pipeline network data collection terminal, node 2 corresponds to the second associated gas pipeline network data collection terminal, and the association degree R(12) between node 1 and node 2 may be obtained by equation (4):

$$R(12) = g(12) * d(12) \quad (4)$$

Wherein g(12) represents a weight coefficient associated with node 1 and node 2, and d(12) represents the distance between gas pipeline network data collection terminals corresponding to node 1 and node 2.

In some embodiments, the weight coefficient associated with node 1 and node 2 may be related to a positional relationship between node 1 and node 2. If node 2 is downstream of node 1, then the weight is greater than 1; conversely, if node 2 is upstream of node 1, then the weight is less than 1.

In some embodiments, at a same distance, a downstream node of a node is more highly correlated with the node, and an upstream node is less correlated with the node.

For example, if the gas pipeline network data collection terminal corresponding to node 1 is the abnormal gas pipeline network data collection terminal, then the first adjustment parameter is generated based on the gas pipeline network data collection terminal and sent to the gas pipeline network data collection terminal corresponding to node 2. At this time, the calculation is performed for the first comprehensive adjustment parameter sent to the gas pipeline network data collection terminal 2 corresponding to node 2. The first coefficient is positively correlated with the association degree R(12) between node 1 and node 2, and R(12) is greater than 1.

For example, if the gas pipeline network data collection terminal corresponding to node 2 is the abnormal gas pipeline network data collection terminal, then the first adjustment parameter is generated based on the gas pipeline network data collection terminal 2 and sent to the gas pipeline network data collection terminal corresponding to node 1. At this time, the calculation is performed for the first comprehensive adjustment parameter sent to the gas pipeline network data collection terminal corresponding to node 1. The first coefficient is positively correlated with the association degree R(21) between node 2 and node 1, and R(21) is less than 1. Obviously, the association degree R(12) is not equivalent to the association degree R(21).

In some embodiments, the first comprehensive adjustment parameter may be related to an abnormal probability corresponding to the abnormal gas pipeline network data collection terminal. The greater the abnormal probability corresponding to the abnormal gas pipeline network data collection terminal is, the greater the first comprehensive adjustment parameter is. For example, the first comprehensive adjustment parameter may be obtained using equation (5):

$$C' = s1*(f1*y1) + s2*(f2*y2) + \ldots + sn*(fn*yn) \quad (5)$$

Wherein C' represents the first comprehensive adjustment parameter; f1, f2, . . . , and fn, and y1, y2, . . . , and yn have the same meaning as in the equation (3); and s1, s2, . . . , and sn represent second coefficients corresponding to abnormal probabilities of the first to the n-th abnormal gas pipeline network data collection terminals, respectively.

In some embodiments, the second coefficient may be positively correlated with the abnormal probability of the corresponding abnormal gas pipeline network data collection terminal.

For example, based on the abnormal gas pipeline network data collection terminal 1 corresponding to node 1 in the terminal layout diagram, the first adjustment parameter is determined to be a reduction in a collection cycle by 30 minutes, the abnormal probability of node 1 is 80%, and the second coefficient 1 corresponding to node 1 is 1.1; node 2 corresponds to the second associated gas pipeline network data collection terminal of the abnormal gas pipeline network data collection terminal 1, the association degree between node 1 and node 2 is 90%, and the first coefficient 1 corresponding to the association degree is 1.2. The first comprehensive adjustment parameter for node 2 is calculated as the second coefficient 1\*(the first coefficient 1\*the first adjustment parameter of the abnormal gas pipeline data collection terminal 1). That is, the first comprehensive adjustment parameter for node 2 is 39.639.6 (i.e., 1.1×1.2× 30) minutes.

In some embodiments of the present disclosure, the first comprehensive adjustment parameter is determined by the smart gas device management platform by considering the situation where the two or more abnormal gas pipeline network data collection terminals correspond to the same second associated gas pipeline network data collection terminal, which can make the adjustment of the gas pipeline network data collection terminal more accurate.

In 530, the first comprehensive adjustment parameter may be sent to the second associated gas pipeline network data collection terminal.

In some embodiments, the smart gas device management platform 130 may send the first comprehensive adjustment parameter to the second associated gas pipeline network data collection terminal that is associated with the two or more abnormal gas pipeline network data collection terminals. After receiving the first comprehensive adjustment parameter, the second associated gas pipeline network data collection terminal adjusts operations based on the first comprehensive adjustment parameter.

In some embodiments of the present disclosure, the first comprehensive adjustment parameter is determined based on the first adjustment parameter generated by the two or more abnormal gas pipeline network data collection terminals, so that an impact of all adjustment parameters can be taken into account comprehensively in a case where a count of the first adjustment parameters is relatively large, and a more reasonable and accurate first comprehensive adjustment parameter can be determined, which can lead to a more effective control of the gas pipeline network data collection terminal.

FIG. 6 is a flowchart illustrating an exemplary process for smart control of a gas pipeline network data collection terminal according to some embodiments of the present disclosure. As shown in FIG. 6, process 600 includes the following operations. In some embodiments, process 600 may be performed by the smart gas device management platform 130 of the smart gas Internet of Things (IoT) system 100.

In 610, future environmental change data at a future time point for an environment in which the gas pipeline network data collection terminal is located may be predicted based on historical gas data of the gas pipeline network data collection terminal, current gas data of the gas pipeline network data collection terminal, historical environmental monitoring data, and current environmental monitoring data.

Historical gas data refers to gas data collected at a preset historical time period or a preset historical time point. Current gas data refers to gas data collected in a current time period or a current time point. More descriptions regarding the gas data may be found in the related descriptions in the previous sections.

The historical environmental monitoring data refers to environmental monitoring data collected during a preset historical time period or a preset historical time point, and the current environmental monitoring data refers to environmental monitoring data collected during the current time period or the current time point. More descriptions regarding the environmental monitoring data may be found in the related descriptions in the previous sections.

More descriptions regarding the future environmental change data may be found in FIG. 2 and the related descriptions thereof.

In some embodiments, the smart gas device management platform 130 may obtain the future environmental change data of the gas pipeline network data collection terminal at a future point in time through various ways. For example, the smart gas device management platform 130 may obtain the future environmental change data by using an environmental data prediction model based on the historical gas data, the current gas data, the historical environmental monitoring data, and the current environmental monitoring data. The environmental data prediction model is a machine learning model such as a convolutional neural network model, a deep neural network model, etc., or a combination thereof.

Figure 7:
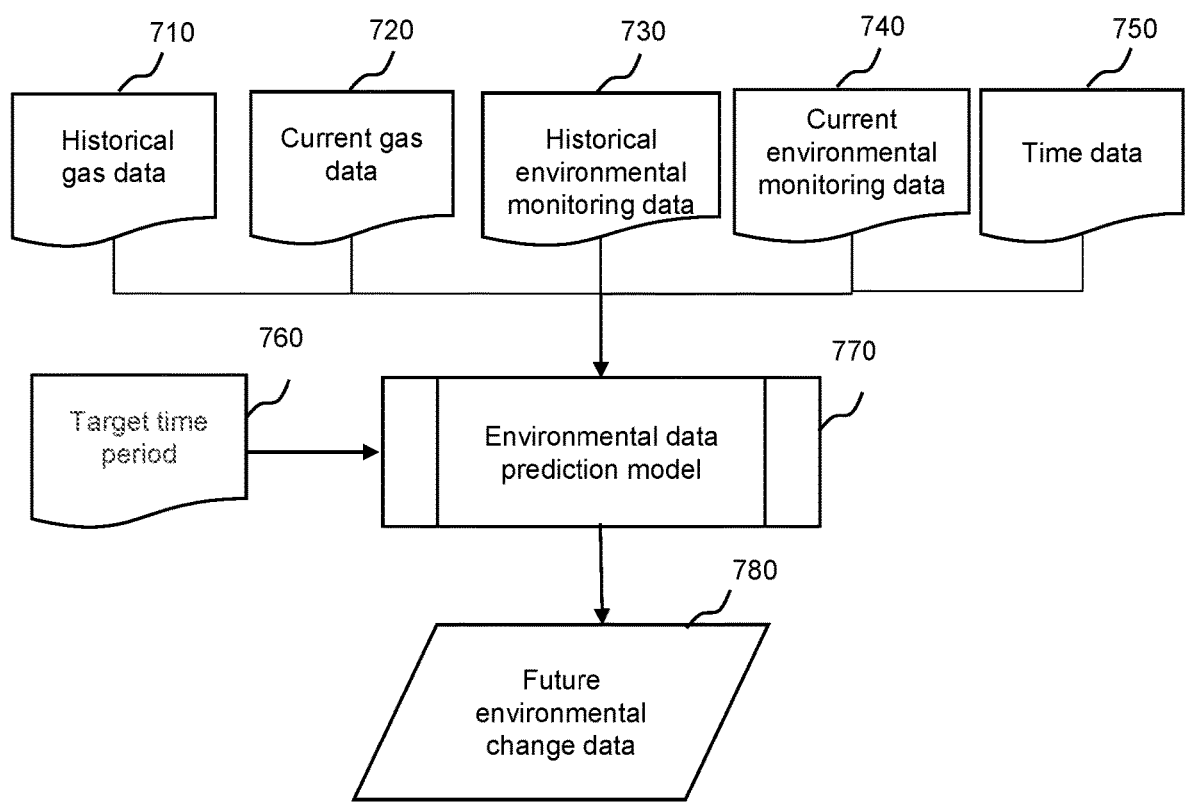
FIG. 7 is a schematic diagram illustrating an environmental data prediction model according to some embodiments of the present disclosure.

FIG. 7 is a schematic diagram illustrating an environmental data prediction model according to some embodiments of the present disclosure.

As shown in FIG. 7, an input of the environmental data prediction model 770 may include historical gas data 710, current gas data 720, historical environmental monitoring data 730, current environmental monitoring data 740, time data 750, and a target time period 760. An output of the environmental data prediction model may include future environmental change data 780. The time data 750 refers to the current time point, and the time data 750 may be used to determine whether the current time point is in a peak gas consumption period. For example, the peak gas consumption period may be designated to be from 12:00 to 14:00. The target time period 760 is a set future time period, such as next 5 hours from the current time point, and the output of the environmental data prediction model 770 may be the future environmental change data 780 at a time point after the target time period expires.

In some embodiments, the environmental data prediction model 770 may be trained based on a large count of second training samples with second labels. In some embodiments, a second training sample may include sample gas data, sample environmental monitoring data, first historical time data (i.e., first historical time points), and a sample target time period. A second label may include actual environmental change data for a second historical time point corresponding to the second training sample. The first historical time point precedes the second historical time point, and the second historical time may be separated from the first historical time point by the sample target time period. The second training sample and the second label may be obtained based on historical data. The second label may be manually labeled.

In some embodiments of the present disclosure, the smart gas device management platform may determine the future environmental change data at the future time point using the environmental data prediction model, which allows for more accurate prediction of a future environmental change and enables more efficient automated control, thereby saving time and labor costs.

In some embodiments, the input of the environmental data prediction model may also include associated gas data and associated environmental monitoring data. The associated gas data and the associated environmental monitoring data refer to gas data and environmental monitoring data of a first associated gas pipeline network data collection terminal associated with the gas pipeline network data collection terminal.

Since gas is flowing, determining the future environmental change data based solely on the gas data and the environmental monitoring data from a single gas pipeline network data collection terminal may result in a less accurate result. Therefore, incorporating the associated gas data and the associated environmental monitoring data into the environmental data prediction model can improve the accuracy of the output of the environmental data prediction model. In addition, a change in an environment in which the first associated gas pipeline network data collection terminal associated to the gas pipeline network data collection terminal is located may to some extent reflect a change in the environment in which the gas pipeline network data collection terminal is located, further enhancing the prediction accuracy.

In 620, in response to determining that the future environmental change data does not meet a second preset condition, a gas pipeline network data collection terminal to be adjusted may be determined.

In some embodiments, a second preset condition refers to a situation where a magnitude of change in the future environmental change data is smaller than a first environmental threshold.

In some embodiments, if the magnitude of change in the future environmental change data exceeds a second environmental threshold, the smart gas device management platform 130 may issue an alert to prompt a staff member to take action. The second environmental threshold is greater than the first environmental threshold.

A gas pipeline network data collection terminal to be adjusted refers to a terminal that needs to be adjusted.

In some embodiments, if the magnitude of change in the future environmental change data of the gas pipeline network data collection terminal is greater than or equal to the first environmental threshold, the gas pipeline network data collection terminal may be determined as the gas pipeline network data collection terminal to be adjusted.

In 630, a second adjustment parameter may be generated based on the future environmental change data.

In some embodiments, the second adjustment parameter may be determined by the smart gas device management platform based on the magnitude of change in the environmental change data. The greater the magnitude of change in the environmental change data is, the greater the second adjustment parameter is.

In some embodiments, the smart gas device management platform 130 may construct a reference table based on the magnitude(s) of change in the future environmental change data and corresponding second adjustment parameter(s), so as to determine the second adjustment parameter through table lookup. Second adjustment parameters corresponding to different future environmental change data may be recorded in the reference table respectively based on historical experience.

In 640, the second adjustment parameter may be sent to the gas pipeline network data collection terminal to be adjusted.

More descriptions regarding the sending of the second adjustment parameter may be found in FIG. 2 and the related descriptions thereof.

In some embodiments, the smart gas device management platform 130 may, in response to determining that the gas pipeline network data collection terminal receives the first adjustment parameter and the second adjustment parameter simultaneously, adjust an operating parameter of the gas pipeline network data collection terminal based on the first adjustment parameter and the second adjustment parameter.

In some embodiments, the gas pipeline network data collection terminal may determine the operating parameter of the gas pipeline network data collection terminal based on the first adjustment parameter and the second adjustment parameter by directly summing the first adjustment parameter and the second adjustment parameter.

In some embodiments, the operation parameter of the gas pipeline network data collection terminal may be determined based on the first adjustment parameter and the second adjustment parameter. Weightings are manually assigned to the first adjustment parameter and the second adjustment parameter, and the operation parameter of the gas pipeline network data collection terminal are determined through a weighted sum. In some embodiments, a weight of the first adjustment parameter or a weight of the second adjustment parameter may be assigned a value of 0. The gas pipeline network data collection terminal may determine the operating parameter automatically upon receiving the first adjustment parameter and the second adjustment parameter.

In some embodiments of the present disclosure, when the gas pipeline network data collection terminal receives the first adjustment parameter and the second adjustment parameter simultaneously, the gas pipeline network data collection terminal may determine the final adjusted operation parameter autonomously, ensuring reasonable adjustment of the operation parameter and achieving automatic collection control.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

In some embodiments, counts describing the quantity of components and attributes are used. It should be understood that such counts used in the description of the embodiments use the modifiers "about," "approximately," or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for smart control of a gas pipeline network data collection terminal, wherein the method is executed by a smart gas device management platform of an Internet of Things (IoT) system, and the method comprises:
receiving, based on a preset transmission cycle, gas data collected by the gas pipeline network data collection terminal and environmental monitoring data collected by an environmental monitoring device, wherein the gas data includes gas pressure data, gas flow data, and gas temperature data, and the environmental monitoring data includes environmental temperature data, environmental visibility data, and environmental humidity data;
constructing a terminal layout diagram based on location data of the gas pipeline network data collection terminal, the gas data, and the environmental monitoring data, wherein the terminal layout diagram includes an edge and a node, the node corresponds to the gas pipeline network data collection terminal, and the edge corresponds a gas pipeline between gas pipeline network data collection terminals, a node feature of the node includes a location of the gas pipeline network data collection terminal, current gas data, historical gas data, current environmental monitoring data, historical environmental monitoring data, and an association degree between the gas pipeline network data collection terminal and other gas pipeline network data collection terminals, and the association degree is related to a distance between the gas pipeline network data collection terminals corresponding to two nodes in the terminal layout diagram and a weight coefficient, the weight coefficient being related to a positional relationship between the two nodes;
determining, based on the terminal layout diagram, an abnormal probability sequence by using an abnormality determination model, wherein the abnormality determination model is a machine learning model, and the abnormal probability sequence includes an abnormal probability of the node corresponding to the gas pipeline network data collection terminal;
in response to determining that the abnormal probability sequence does not meet a first preset condition, determining an abnormal gas pipeline network data collection terminal;
determining a first adjustment parameter based on the abnormal probability corresponding to the abnormal gas pipeline network data collection terminal;
sending the first adjustment parameter to one or more first associated gas pipeline network data collection terminals of the gas pipeline network data collection terminal, wherein the one or more first associated gas pipeline network data collection terminals of the gas pipeline network data collection terminal are one or more gas pipeline network data collection terminals whose association degree with the gas pipeline network data collection terminal is greater than an association threshold;
in response to determining that a second associated gas pipeline network data collection terminal is associated with two or more abnormal gas pipeline network data collection terminals, generating two or more first adjustment parameters based on the two or more abnormal gas pipeline network data collection terminals;
determining a first coefficient based on the association degree between the abnormal gas pipeline network data collection terminal and the second associated gas pipeline network data collection terminal corresponding to the abnormal gas pipeline network data collection terminal;
determining a first comprehensive adjustment parameter based on the first adjustment parameter and the first coefficient, wherein the first comprehensive adjustment parameter is related to the abnormal probability corresponding to the abnormal gas pipeline network data collection terminal;
sending the first adjustment parameter to the second associated gas pipeline network data collection terminal of the abnormal gas pipeline network data collection terminal;
predicting, based on the gas data and the environmental monitoring data, future environmental change data at a future time point for an environment in which the gas pipeline network data collection terminal is located;
in response to determining that the future environmental change data does not meet a second preset condition, generating a second adjustment parameter; and
sending the second adjustment parameter to the gas pipeline network data collection terminal.

2. The method according to claim 1, further comprising:
determining an importance level of the abnormal gas pipeline network data collection terminal, and the first adjustment parameter is related to the importance level.

3. The method according to claim 1, further comprising:
predicting, through an environmental data prediction model, the future environmental change data at the future time point for the environment in which the gas pipeline network data collection terminal is located based on the historical gas data of the gas pipeline network data collection terminal, the current gas data of the gas pipeline network data collection terminal, the historical environmental monitoring data, and the current environmental monitoring data, wherein the environmental data prediction model is a machine learning model;
in response to determining that the future environmental change data does not meet the second preset condition, determining a gas pipeline network data collection terminal to be adjusted;
generating the second adjustment parameter based on the future environmental change data; and
sending the second adjustment parameter to the gas pipeline network data collection terminal to be adjusted.

4. An Internet of Things (IoT) system for smart control of a smart gas pipeline network data collection terminal, wherein the IoT system comprises a smart gas user platform, a smart gas service platform, a smart gas device management platform, a smart gas sensing network platform, and a smart gas object platform,
the smart gas device management platform includes a smart gas indoor device parameter management sub-platform, a smart gas pipeline network device parameter management sub-platform, and a smart gas data center;

the smart gas sensing network platform includes a smart gas indoor device sensing network sub-platform and a smart gas pipeline network device sensing network sub-platform;

the smart gas object platform includes a smart gas indoor device object sub-platform and a smart gas pipeline network device object sub-platform;

the smart gas data center is configured to receive, based on a preset transmission cycle, gas data collected by the gas pipe network data collection terminal and environmental monitoring data collected by an environmental monitoring device through the smart gas pipeline network device sensing network sub-platform, and send the gas data and the environmental monitoring data to the smart gas pipeline network device parameter management sub-platform, wherein the gas data includes gas pressure data, gas flow data, and gas temperature data, the environmental monitoring data includes environmental temperature data, environmental visibility data, and environmental humidity data, the preset transmission cycle is determined by the smart gas pipeline network device parameter management sub-platform and sent to the smart gas pipeline network device object sub-platform via the smart gas pipeline network device sensing network sub-platform;

the smart gas device management platform is configured to construct a terminal layout diagram based on location data of the gas pipeline network data collection terminal, the gas data, and the environmental monitoring data, wherein the terminal layout diagram includes an edge and a node, the node corresponds to the gas pipeline network data collection terminal, and the edge corresponds a gas pipeline between gas pipeline network data collection terminals, a node feature of the node includes a location of the gas pipeline network data collection terminal, current gas data, historical gas data, current environmental monitoring data, historical environmental monitoring data, and an association degree between the gas pipeline network data collection terminal and other gas pipeline network data collection terminals, and the association degree is related to a distance between the gas pipeline network data collection terminals corresponding to two nodes in the terminal layout diagram and a weight coefficient, the weight coefficient being related to a positional relationship between the two nodes;

the smart gas device management platform is configured to determine, based on the terminal layout diagram, an abnormal probability sequence by using an abnormality determination model, wherein the abnormality determination model is a machine learning model, and the abnormal probability sequence includes an abnormal probability of the node corresponding to the gas pipeline network data collection terminal;

the smart gas device management platform is configured to, in response to determining that the abnormal probability sequence does not meet a first preset condition, determine an abnormal gas pipeline network data collection terminal;

the smart gas device management platform is configured to determine a first adjustment parameter based on the abnormal probability corresponding to the abnormal gas pipeline network data collection terminal;

the smart gas pipeline network device parameter management sub-platform is configured to send the first adjustment parameter to the smart gas pipeline network device object sub-platform via the smart gas pipeline network device sensing network sub-platform, and the smart gas pipeline network device object sub-platform is configured to send the first adjustment parameter to one or more first associated gas pipeline network data collection terminals of the gas pipeline network data collection terminal, wherein the one or more first associated gas pipeline network data collection terminals of the gas pipeline network data collection terminal are one or more gas pipeline network data collection terminals whose association degree with the gas pipeline network data collection terminal is greater than an association threshold;

the smart gas device management platform is configured to:
  in response to determining that a second associated gas pipeline network data collection terminal is associated with two or more abnormal gas pipeline network data collection terminals, generate two or more first adjustment parameters based on the two or more abnormal gas pipeline network data collection terminals;
  determine a first coefficient based on the association degree between the abnormal gas pipeline network data collection terminal and the second associated gas pipeline network data collection terminal corresponding to the abnormal gas pipeline network data collection terminal;
  determine a first comprehensive adjustment parameter based on the first adjustment parameter and the first coefficient, wherein the first comprehensive adjustment parameter is related to the abnormal probability corresponding to the abnormal gas pipeline network data collection terminal; and
  send the first comprehensive adjustment parameter to the second associated gas pipeline network data collection terminal;

the smart gas pipeline network device parameter management sub-platform is configured to predict, based on the gas data and the environmental monitoring data, future environmental change data at a future time point for an environment in which the gas pipeline network data collection terminal is located, and the smart gas data center is configured to store the future environmental change data;

the smart gas pipeline network device parameter management sub-platform is configured to, in response to determining that the future environmental change data does not meet a second preset condition, generate a second adjustment parameter; and the smart gas pipeline network device parameter management sub-platform is configured to send the second adjustment parameter to the gas pipeline network data collection terminal.

5. The IoT system according to claim 4, wherein the smart gas device management platform is configured to determine an importance level of the abnormal gas pipeline network data collection terminal, and the first adjustment parameter is related to the importance level.

6. The IoT system according to claim 4, wherein the smart gas device management platform is configured to:
  predict, through an environmental data prediction model, the future environmental change data at the future time point for the environment in which the gas pipeline network data collection terminal is located based on the historical gas data of the gas pipeline network data collection terminal, the current gas data of the gas pipeline network data collection terminal, the historical environmental monitoring data, and the current environmental monitoring data, wherein the environmental data prediction model is a machine learning model;

in response to determining that the future environmental change data does not meet the second preset condition, determine a gas pipeline network data collection terminal to be adjusted;

generate the second adjustment parameter based on the future environmental change data; and send the second adjustment parameter to the gas pipeline network data collection terminal to be adjusted.

\* \* \* \* \*